United States Patent
Elrod et al.

(10) Patent No.: US 6,488,453 B2
(45) Date of Patent: *Dec. 3, 2002

(54) AUTOMATED QUILL DRIVE ASSEMBLY FOR A MILLING MACHINE

(76) Inventors: Dwayne S. Elrod, 9915 Bay Horse Cir., Flagstaff, AZ (US) 86004; Elizabeth Domokos-Elrod, 9915 Bay Horse Cir., Flagstaff, AZ (US) 86004

( * ) Notice: Subject to any disclaimer, the term of this patent is extended or adjusted under 35 U.S.C. 154(b) by 0 days.

This patent is subject to a terminal disclaimer.

(21) Appl. No.: 09/925,882

(22) Filed: Aug. 6, 2001

(65) Prior Publication Data

US 2002/0028119 A1 Mar. 7, 2002

Related U.S. Application Data

(63) Continuation of application No. 09/339,157, filed on Jun. 24, 1999, now Pat. No. 6,357,975, which is a continuation of application No. 09/057,279, filed on Apr. 8, 1998, now Pat. No. 5,941,663.

(51) Int. Cl.$^7$ ................................................. B23C 1/12

(52) U.S. Cl. .................... 409/80; 408/136; 408/234; 409/185; 409/210; 409/214; 409/235

(58) Field of Search ................... 408/136, 234, 408/236; 409/80, 144, 185, 201, 206, 210, 214, 218, 231, 235

(56) References Cited

U.S. PATENT DOCUMENTS 5,941,663 A * 8/1999 Elrod et al. .................... 409/80
6,357,975 B1 * 3/2002 Elrod et al. ................. 408/136

* cited by examiner

*Primary Examiner*—Daniel W. Howell
(74) *Attorney, Agent, or Firm*—Shook, Hardy & Bacon L.L.P.

(57) ABSTRACT

An automated quill drive assembly is adapted to be retrofit on a milling machine having a frame presenting a quill head and a quill supported on the head for rotation and for relative shiftable movement along a linear axis between retracted and extended positions. The quill head includes a centrally disposed lower lug, a quill feed engagement control lever boss located above and spaced to one side of the lug, and a transmission cover opening located above and spaced to a side of the lug opposite the quill feed engagement control lever boss. The automated quill drive assembly includes a housing adapted to be mounted to the lug, the quill feed engagement control lever boss, and the transmission cover opening, a motor supported on the housing, and a transmission supported on the housing for transmitting automated movement from the motor to the quill to move the quill between the retracted and extended positions. A sensor is provided for continuously sensing the position of the quill as the quill is moved between the retracted and extended positions. The sensor provides an output signal indicative of the position of the quill for both manual and automated movement.

5 Claims, 4 Drawing Sheets

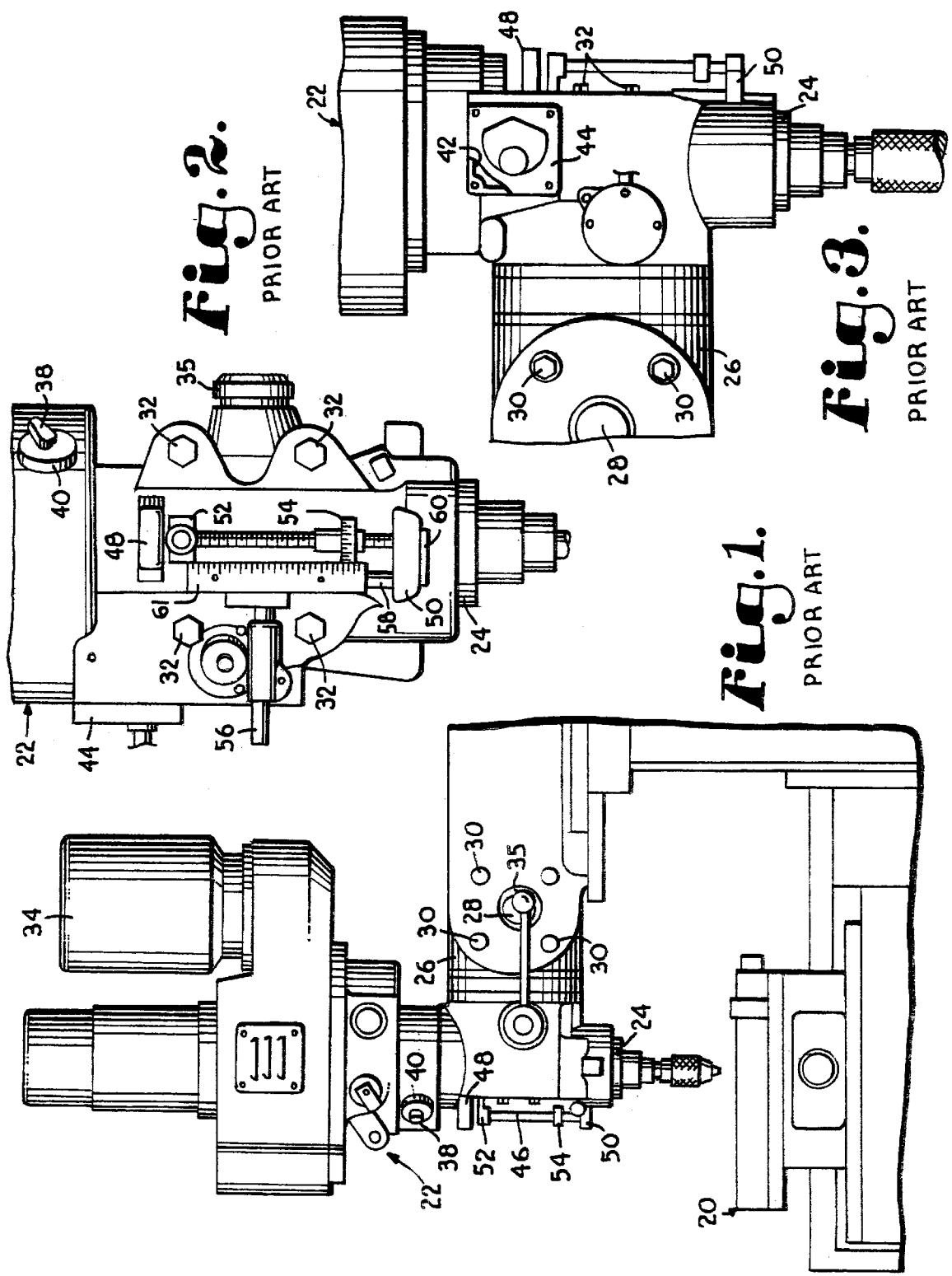

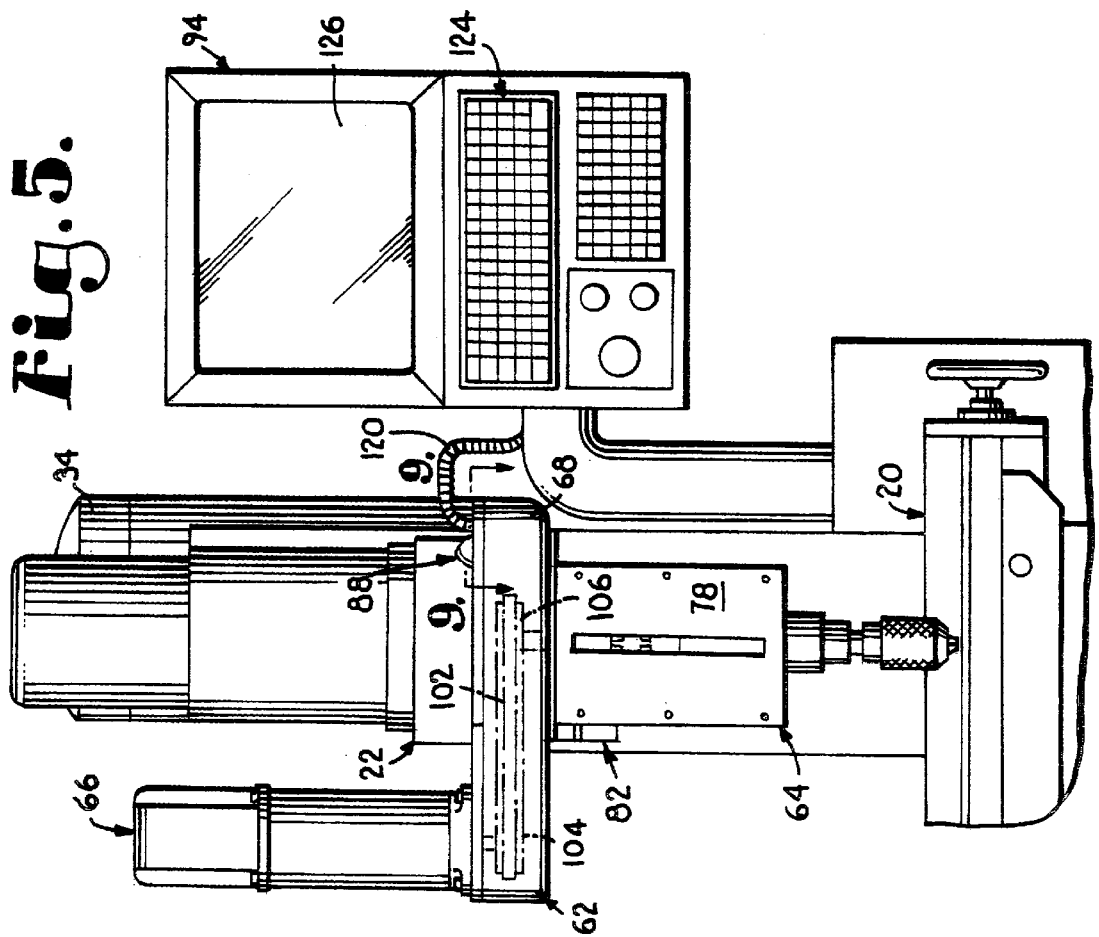
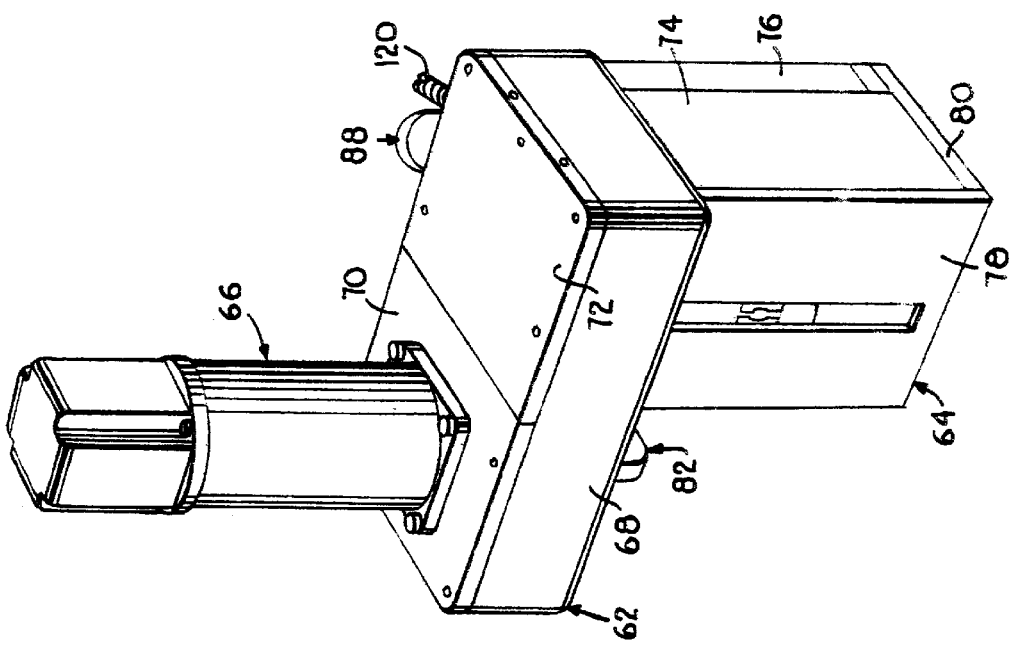

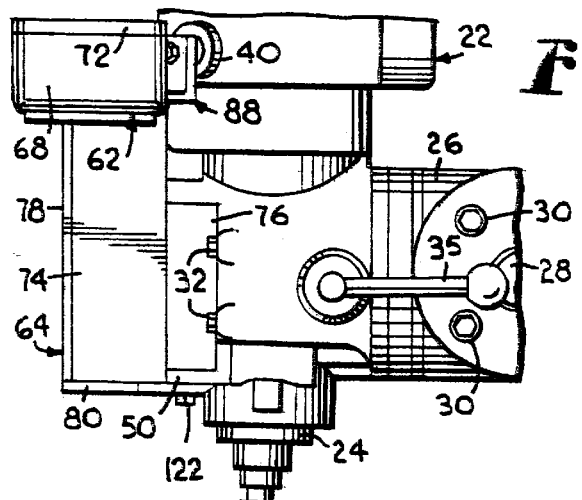
Fig. 7.
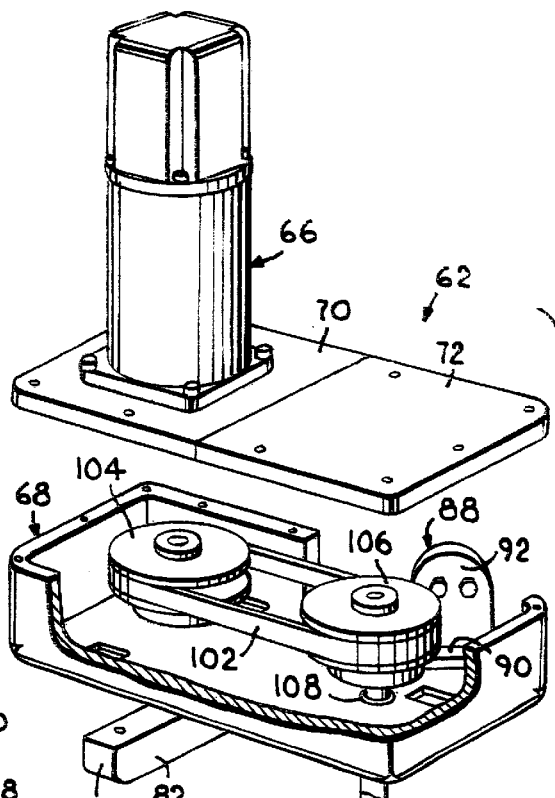
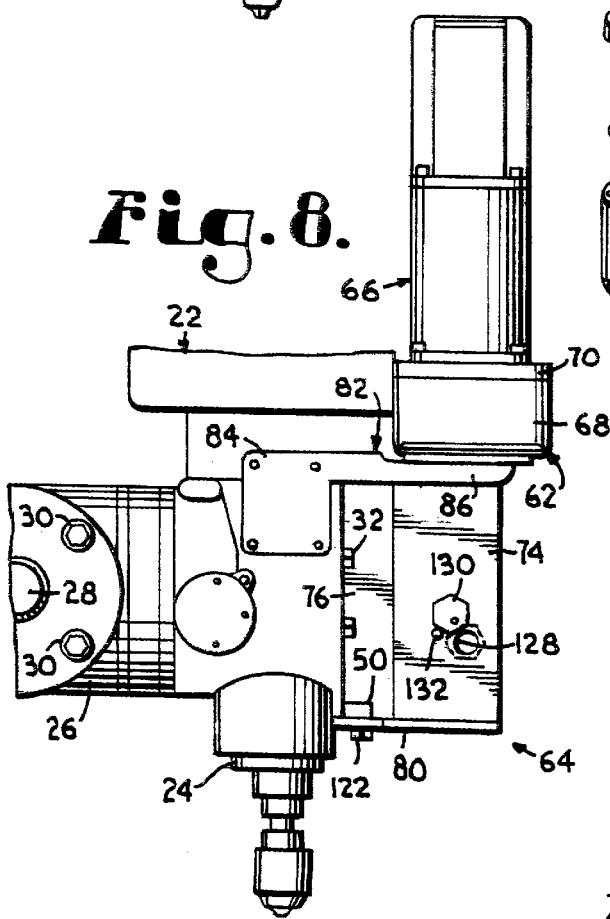
Fig. 8.
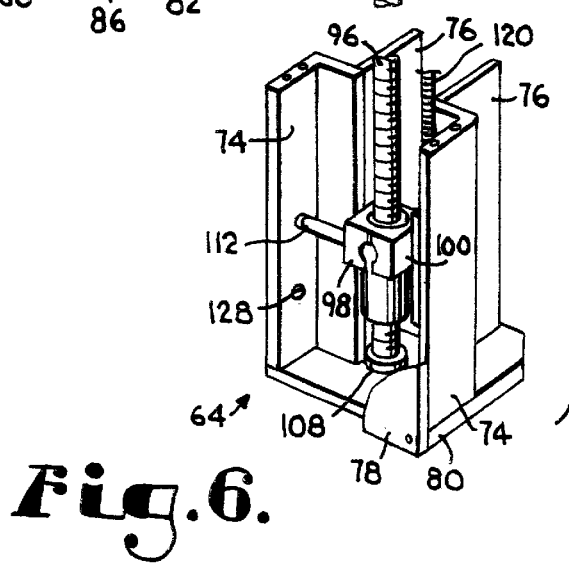
Fig. 6.

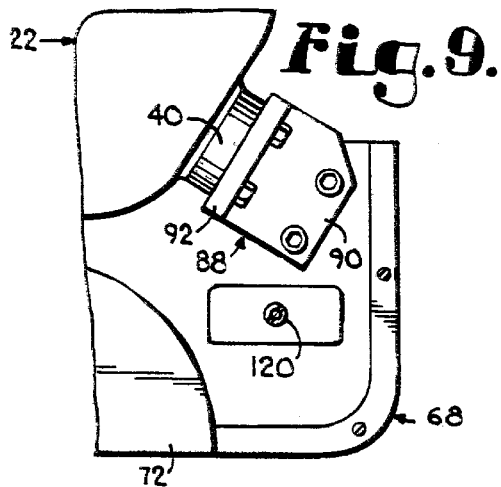
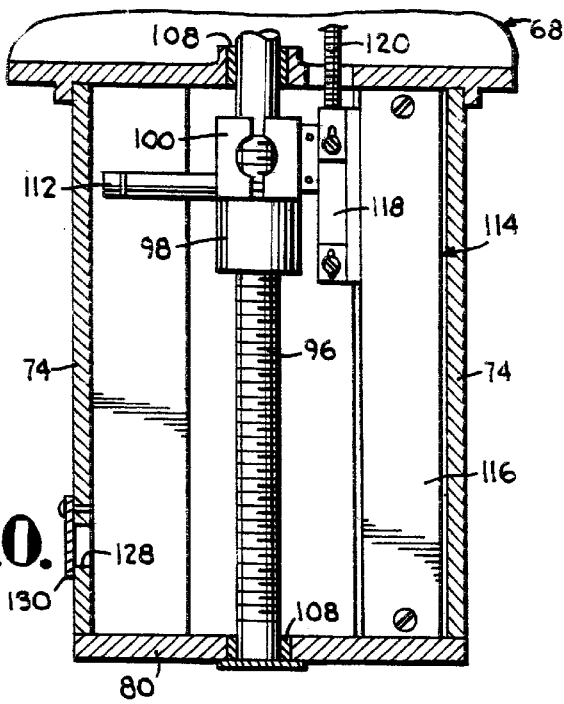
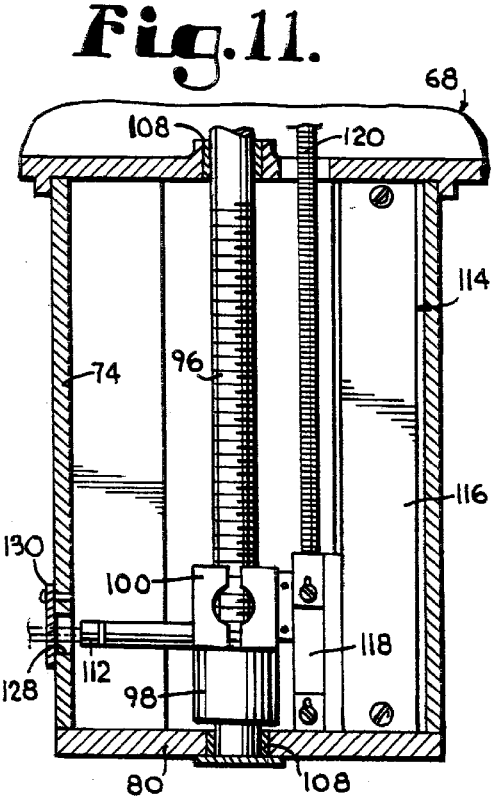
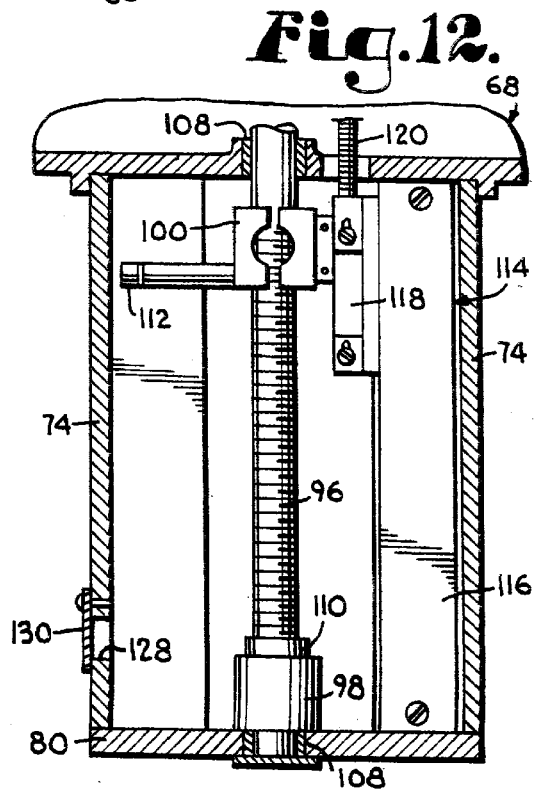

AUTOMATED QUILL DRIVE ASSEMBLY FOR A MILLING MACHINE

CROSS-REFERENCE TO RELATED APPLICATIONS

This application is a continuation of application Ser. No. 09/339,157 filed on Jun. 24, 1999, now U.S. Pat. No. 6,357,975 which claims the benefit of application Ser. No. 09/057,279 filed on Apr. 8, 1998, now U.S. Pat. No. 5,941,663.

STATEMENT REGARDING FEDERALLY SPONSORED RESEARCH OR DEVELOPMENT

"Not Applicable"

BACKGROUND OF THE INVENTION

The present invention relates generally to milling machines, and more particularly to an automated quill drive assembly that is adapted for retrofitted use on a conventional milling machine to drive Z-axis movement of the quill in response to control from a conventional computer numerical control ("CNC") controller or the like.

A conventional milling machine, such as a knee mill, includes a table on which a work piece can be supported, and a quill that supports a tool for movement toward and away from the table for milling the work piece. Typically, the table is adjustable within a horizontal plane from side-to-side and from front-to-back relative to the quill. Lateral side-to-side adjustment is considered X-axis adjustment, and front-to-back adjustment is referenced as Y-axis adjustment. As such, the position of a work piece can be changed in two planes, and the quill moves vertically along a Z-axis such that three-axis adjustment of the tool relative to the work piece is possible.

Although many milling machines are manual, in the sense that adjustment of the table and movement of the quill is manually achieved, improvements in the art have resulted in fully automatic machines in which X-axis, Y-axis and Z-axis movement of the table and/or quill are computer controlled and carried out by stepper or servo motors. These automatic machines provide many advantages over manual machines, especially with respect to the reproducibility of milling operations performed with such milling machines. However, automatic machines lack the versatility of manual designs, and cost significantly more to purchase and use.

Automated drive assemblies are known that can be retrofitted on an existing milling machine to automate the X-axis and Y-axis movement of the table and the Z-axis movement of the quill. Typically, a CNC controller is Wed on the machine at the same time as one or more of these drive assemblies such that the drive assemblies are capable of being operated automatically subsequent to installation.

A conventional Z-axis or quill drive assembly broadly includes a housing supported on the quill head of the machine, a stepper or servo motor supported on the housing and operatively connected to a conventional CNC controller, and a transmission that is supported on the housing and connected between the motor and the quill to transmit the motor drive to the quill so that when the motor is operated, the quill is moved between the retracted and extended positions. The housing is secured to the head at three points, one of which is defined by a lower casting lug of the quill head normally used to support a depth stop screw. The second and third points of attachment of the housing are defined by a pair of vertically spaced tramming bolts provided along the right front side of the quill head.

In the conventional automated quill drive assembly, the position of the quill is continuously monitored by providing feedback from the motor to the CNC controller indicative of the position or operation of the motor. In addition, limit switches are sometimes employed to provide a positive signal when the quill is moved to either the fully retracted or fully extended limit position. In this way, the CNC controller is able to control operation of the motor to accurately position and reposition the quill along the Z-axis during milling operations.

Although conventional automated quill drive assemblies do allow a manual milling machine to be retrofitted for automatic operation, further improvements would be advantageous. For example, because the housing of a conventional assembly is mounted to two of the tramming bolts on the quill head, the housing must be loosened in order to tram the head. Such added complexity makes tramming of the quill head difficult and time consuming.

Further, although tree mounting points are provided for the housing of a conventional quill drive assembly, two of the points are in line with one another vertically, and the third point is spaced laterally from the other two by only 1 to 2 inches. As a result, the motor can twist or wind up when milling a heavy cut, reducing the accuracy of the machine, and increasing wear on the quill.

Another feature of the conventional quill drive assembly subject to improvement is the source of feedback provided to the CNC controller which allows the position of the quill to be continuously monitored and controlled during automatic operation. Because the conventional assembly monitors quill movement indirectly by sensing motor movement or operation, the CNC controller can only monitor the quill position when the quill is operated by the motor, or when manual quill movement is transmitted back to the motor. As such, manual operation of the quill is either frustrated or must be performed without the benefit of feedback to the CNC controller. When manual operation is performed without such feedback, depth control and repeatability become difficult to achieve.

BRIEF SUMMARY OF THE INVENTION

It is an object of the present invention to provide an automated quill drive assembly for use with a milling machine, wherein the presence of the quill drive assembly does not prevent or impede tramming of the quill head and permits quick conversion between automated and manual operation of the machine.

It is another object of the invention to provide an automated quill drive assembly in which the position of the quill is sensed directly, rather than indirectly through a motor, allowing the position of the quill to be continuously displayed by a CNC controller regardless of whether quill movement is achieved manually or automatically.

Yet another object of the invention is to provide a quill drive assembly that can be rigidly secured to the quill head of a conventional milling machine at three laterally spaced points to fix the motor and other components of the assembly against flexing under the stress of heavy milling operations.

In accordance with these and other objects evident from the following description of a preferred embodiment of the invention, an automated quill drive assembly is provided that is specially adapted to be retrofit on a milling machine of the category having a frame presenting a quill head and a quill supported on the head for rotation and for relative shiftable movement along a linear axis between retracted and extended positions. Typically, the quill head of the milling machine includes a centrally disposed lower lug, a quill feed engagement control lever boss located above and spaced to one side of the lug, and a transmission cover boss located above and spaced to a side of the lug opposite the quill feed engagement control lever boss. Further, the milling machine includes a manually actuated lever supported on the head and operatively connected to the quill for moving the quill between the retracted and extended positions.

The automated quill drive assembly includes a housing adapted to be mounted to the casting lug, the quill feed engagement control lever boss, and the transmission cover opening, a motor supported on the housing, and a transmission supported on the housing and being adapted for connection between the motor and the quill for transmitting drive to the quill to move it between the retracted and extended positions. A controller, such as a CNC controller, is preferably employed with the quill drive assembly for controlling automatic movement of the quill, as well as for controlling other operations of the milling machine, e.g. X-axis and Y-axis drive assemblies of conventional construction.

In accordance with another aspect of the present invention, the automated quill drive assembly includes a housing, a motor, a transmission connected between the motor and the quill for transmitting drive to the quill, and a sensor for continuously sensing the position of the quill as the quill is moved between the retracted and extended positions. The sensor provides an output signal indicative of the position of the quill for both manual and automated movement, and the signal can be supplied to a conventional controller to provide a display of the position of the quill as it is moved.

By providing a quill drive assembly in accordance with the present invention, numerous advantages are realized. For example, by providing an automated quill drive assembly that is mounted to the quill head at a first point of attachment disposed in a vertical plane including the longitudinal axis of the quill, and at second and third points of attachment disposed on opposite sides of the vertical plane, the assembly is rigidly secured in place on the quill head, fixing the motor and other assembly components against flexing when a heavy cut is made or when the quill drive assembly is otherwise placed under stress.

In addition, because the quill drive assembly of the present invention does not employ the existing tramming bolts as mounting points, it is not necessary to loosen the quill drive assembly or to undertake other cumbersome steps when tramming the head of the milling machine as may be required for certain operations.

Another advantage achieved by the present invention resides in the use of a sensor that directly senses quill movement rather than motor movement, enabling the controller to provide an indication of quill position during both automated and manual quill movement. This allows an operator to control the depth of the quill and to repeat milling operations with extreme accuracy, even when performing such operations manually.

BRIEF DESCRIPTION OF THE SEVERAL VIEWS OF THE DRAWING

The preferred embodiment of the present invention is described in detail below with reference to the attached drawing, wherein:

FIG. 1 is a fragmentary right side elevational view of a conventional milling machine;

FIG. 2 is a fragmentary front elevational view of the milling machine, illustrating a quill and quill head forming a part thereof;

FIG. 3 is a fragmentary left side elevational view of the quill and quill head of the milling machine;

FIG. 4 is a perspective view of an automated quill drive assembly constructed in accordance with the preferred embodiment of the present invention;

FIG. 5 is a fragmentary front elevational view of the automated quill drive assembly and a conventional computer numerical control assembly mounted on the milling machine;

FIG. 6 is an exploded perspective view of the quill drive assembly, partially broken away to illustrate various components forming a part thereof;

FIG. 7 is a fragmentary right side elevational view of the quill and head of the milling machine, illustrating the quill drive assembly assembled on the machine;

FIG. 8 is a fragmentary left side elevational view of the quill and head of the milling machine, illustrating the quill drive assembly assembled on the machine;

FIG. 9 is a fagmenar top plan view of a mounting bracket forming a part of the quill drive assembly;

FIG. 10 is a fragmentary front elevational view of the quill drive assembly, illustrating the quill in a fully retracted position during automatic operation of the quill;

FIG. 11 is a fragmentary front elevational view of the quill drive assembly, illustrating the quill in a fully extended position; and FIG. 12 is a fragmentary front elevational view of the quill drive assembly, illustrating the quill in a fully retracted position during manual operation of the quill.

DETAILED DESCRIPTION OF THE INVENTION

A conventional milling machine is shown in FIG. 1, and broadly includes a frame presenting a table 20 and a quill head 22 overlying the table, and a quill 24 supported on the head for rotation and for relative shiftable movement along the central longitudinal axis thereof toward and away from the table between reacted and extended positions.

The frame includes an upstanding column which supports the quill and head, and a knuckle 26 supported on the column for pivotal movement about a transverse, horizontally extending shaft 28. The knuckle is secured in place relative to the column by a plurality of tramming bolts 30 which can be loosened to enable the orientation of the knuckle to be adjusted about the shaft The head 22, in turn, is mounted on the knuckle for pivotal movement about a horizontal axis that is perpendicular to the axis of the shaft 28, and as shown in FIG. 2, a plurality of tramming bolts 32 are used to fix the head relative to the knuckle. The bolts 32 can be loosened to allow the orientation of the head to be adjusted relative to the knuckle. As such, angular adjustment of the quill about the X and Y axes can be achieved in order to orient the quill at any desired angle relative to the table.

Returning to FIG. 1, a motor 34 is mounted on the head for driving rotation of the quill, and a manual feed lever 35 is connected to the quill through a rack and pinion quill feed transmission so that when the lever is shifted, the quill is moved between the retracted and extended positions. The motor 34 is connected to the quill through a suitable transmission arrangement for automatically extending the quill when the transmission is engaged The feed transmission arrangement includes a quill feed engagement control lever 38 that protrudes from a boss 40 on the right side of the quill head for permitting an operator to engage and disengage the feed transmission, as desired. As shown in FIG. 3, an opening 42 is provided on the left side of the head opposite the quill feed engagement control lever, and a cover 44 is normally held in place over the opening by screws that can be removed to allow access to the transmission components within the head 22. The transmission cover opening 42 is spaced laterally from the quill feed engagement control lever box by about 9 inches, and is also disposed at a height below that of the boss on the quill head As illustrated in FIG. 2, the feed transmission of the motor 34 includes a feed kick-out mechanism for disconnecting the quill from the feed drive of the motor when the quill has been extended by a distance preset by the user. The feed kick-out mechanism includes a depth stop screw 46 supported between a pair of cast lugs 48, 50 of the quill head, a depth stop block 52 received around the stop screw and secured to the quill through a slot in the head, a travel stop ring 54 threaded onto the stop screw for adjustment along the length thereof, a kick-out follower 56 supported in a sleeve for translational movement, a cam rod 58, and an engagement lever 60. When the quill feed engagement control lever 38 is moved to the engaged position, the quill is moved automatically toward the extended position by the motor and the depth stop block 52 travels along the depth stop screw 46 until the block engages the travel stop ring 54. The force of the block against the ring trips the engagement lever 60 to moves the cam rod 58 upward. The cam rod thus engages the kick-out follower 56, forcing it laterally to a position in which it disconnects the feed transmission between the motor and the quill. A scale 61 is mounted along the left side of the depth stop screw 46 to allow a machinist to gauge the depth of the quill, and to set the position of the travel stop ring 54 so that drive to the quill is disconnected at the desired depth.

The milling machine thus far described is a conventional knee mill, e.g. of the type manufactured by Bridgeport as a Series 1 type milling machine. Similar machines are made by several other manufacturers around the world, and the automated quill drive assembly of the present invention can be easily adapted for use on any of these conventional machines without departing from the scope of the present invention.

Turning to FIG. 4, the preferred automated quill drive assembly is shown prior to assembly on the milling machine. The assembly includes an upper housing 62, a lower housing 64, a motor 66 supported on the upper housing, and a transmission adapted for transmitting drive from the motor to the quill of the milling machine.

The upper housing includes a pan 68 having a bottom wall and upstanding front, side, and back walls, and a cover that protects the components supported within the upper housing. The cover is preferably formed in two pieces 70, 72, wherein the piece 70 supports the motor 66 and is installed at the same time as the motor, and the piece 72 is secured to the pan only after the components within the upper housing have been assembled. Although not shown, it is possible to provide either or both of the cover pieces with edges that protrude beyond the side walls of the pan such that slots or holes can be formed along the edges of the cover to receive and support tools and the like.

The lower housing 64 includes a pair of angles 74 that together present the side and back walls of the lower housing, a pair of laterally spaced chip covers 76 that protrude from the back of the angles to prevent chips from betting into the housing during milling operations, and a front cover 78, shown in FIG. 4, fastened to the front edges of the angles. In addition, a bottom plate 80 is secured to the bottom ends of the angles for closing off the lower housing from beneath and for holding the angles and the chip covers together as a unit prior to assembly, as shown in FIG. 6.

As shown in FIG. 8, a support arm 82 is provided for supporting the upper housing on the left side of the quill head, and includes a first end 84 sized for receipt over the transmission cover opening when the transmission cover is removed from the head, and a second free end 86. A plurality of trasverse holes extend through the first end of the support arm 82 for permitting attachment of the arm over the opening in place of the transmission cover, and vertical holes are provided at the free end 86 for allowing the arm to be fastened to the bottom wall of the pan 68.

As illustrated in FIG. 9, a mounting bracket 88 is provided for supporting the upper housing on the right side of the quill head, and includes a base portion 90 and an upstanding portion 92. The base portion 90 includes a pair of holes or slots for permitting the bracket to be secured to the bottom wall of the pan by suitable fasteners. The upstanding portion 92 includes a pair of holes or slots that can be aligned with the existing holes in the quill feed engagement control lever boss to permit the bracket to be secured to the boss over the lever when the knob of the lever is removed. Preferably, an additional threaded hole in the upstanding portion receives a set screw which can be tightened down against the quill feed engagement control lever when the lever is in the disengaged position such that the lever is positively locked against movement to the engaged position while the quill drive assembly is installed.

The motor 66 can be either a servo or stepper motor, and is supported on the cover piece 70 of the upper housing such that an output shaft of the motor is disposed within the housing, as shown in FIG. 5. The motor 66 is connected to a power source through a conventional controller, such as a CNC controller 94 so that operation of the motor can be controlled automatically. If such a controller is not already provided on the milling machine with which the automated quill drive assembly is to be used, it is assembled on the machine at the same time as the quill drive assembly. It is understood that such controllers are known in the art, and that any conventional type of CNC controller or the like can be used without departing from the scope of the present invention.

As shown in FIG. 6, the transmission of the quill drive assembly includes a ball screw 96 supported for rotation about an axis parallel to the axis of rotation of the quill, a ball nut 98 supported on the ball screw for movement along the screw when the screw is rotated relative to the ball nut, a ball nut block 100 fastened to the ball nut and to the quill, and a belt 102 received over pulleys 104, 106 keyed to the output shaft of the motor 66 and to the upper end of the ball screw 96. As such, rotation of the motor output shaft is transmitted to the ball screw 96, axially translating the ball nut 98 along the screw. The ball nut block 100, being secured to the ball nut, also is shifted axially, moving the quill between the retracted and extended positions.

Turning to FIG. 10, the ball screw 96 is supported in sealed bearings 108 provided in the bottom plate 80 of the lower housing 64 and the bottom wall of the pan 68, and presents an upper end that protrudes into the upper housing and is keyed to the pulley 106. As shown in FIG. 12, the ball nut is received on the screw for translational movement when the screw is rotated relative to the nut, and presents an upper journal 110 that is received in the ball nut block 100.

The ball nut block 100 includes a vertical hole within which the ball screw 96 is received. However, the hole is oversized relative to the ball screw so that the block is free to travel along the length of the screw without engaging the ball screw threads. As such, unless the ball nut block 100 and ball nut 98 are fastened together, the block will not move as a result of rotation of the ball screw. The rear end of the ball nut block that is fastened to the quill presents a radiused surface that matches the radius of the quill so that the block self-aligns with the quill when the block is placed against the quill and fastened in place.

Preferably, the block 100 is fastened to the quill by a socket head cap screw that extends through the block and into an existing threaded hole in the quill. In the milling machine as originally constructed, as shown in FIG. 2, the threaded hole receives the depth stop block 52 which is removed prior to installation of the automated drive assembly. A bore extends through the block 100 from front to back, and is sized for receipt of the socket head cap screw by which the block is secured to the quill. The front end of the block is provided with an air gap at the bottom of the bore, and a laterally extending bore extends across the gap for receipt of a socket head cap screw 112. The socket head cap screw can be threaded into the bore to pinch the gap, allowing the block to be tightened against the journal 110 of the ball nut 98. Preferably, a tubular arm protrudes from the left side of the block in line with the laterally extending bore so that the socket head cap screw can be disposed adjacent the side of the lower housing 64. This simplifies access to the socket head cap screw to enable ready conversion between automated and manual modes of operation.

As shown in FIG. 10, a sensor 114 forms a part of the assembly, and includes a first part 116 fixed to one off the angles 74, a second part 118 secured to the ball nut block 100, and a bus or cable 120 connecting the sensor to an input of the CNC controller. Preferably, the sensor is a linear feedback device such as a conventional glass scale or magnetic scale, wherein the first part 116 includes a scale and the second part 118 includes a pointer that moves along the scale when the ball nut block 100 moves relative to the lower housing 64. The sensor 114 provides an output signal that is used by the CNC controller in controlling operation of the motor during automated operation of the quill, and in displaying the position of the quill as it is moved between the retracted and extended positions.

Because the sensor 114 is connected to the quill directly through ball nut block 100, it provides a continuous indication of the position of the quill regardless of the position of the output shaft of the motor. As such, the sensor outputs an accurate position-indicative signal during both automated and manual operation that is used by the CNC controller to provide a display of the depth or travel position of the quill. The signal is also used by the CNC controller as a feedback signal during automated operation to operate the motor.

Although the sensor 114 is illustrated as forming a part of the particular automated drive assembly shown and described herein, it is understood that this arrangement is capable of use on other types and constructions of automated quill drive assemblies. In addition, this arrangement of the invention may also have application in a milling machine that is originally constructed to permit both manual and automated movement of the quill, and need not be used merely on retrofitted assemblies.

With reference to FIG. 2, prior to installation of the quill drive assembly on a miffing machine, the depth stop screw 46, travel stop ring 54, depth stop block 52, engagement lever 60 and scale 61 are removed, as are the knob of the quill feed control lever 38 and the transmission cover 44. Thereafter, the ball nut block is secured to the quill, and the lower housing is positioned on the front of the quill head, as shown in FIG. 7, with the bottom plate 80 of the lower housing 64 positioned against the underside of the lower front casting lug 50 of the quill head. A cap screw 122 is inserted through a hole in the bottom plate and through an existing hole in the lug 50 through which the depth stop screw originally extended. A nut is fastened to the cap screw form above to fasten the lower housing 64 on the lug 50. Preferably, an installation tool is provided to facilitate alignment of the assembly with the quill head before the nut is tightened fast to the lug. At the same time of positioning the lower housing relative to the lower casting lug 50, the ball screw is trained through the vertical hole in the ball nut block, as shown in FIG. 6.

Once the lower housing 64 is aligned and secure, the pan 68 is lowered onto the angles 74, aligned with the ball screw 96, and secured in place by a plurality of cap screws that are passed through holes in the bottom wall of the pan into threaded holes formed in the top edges of the angles. The mounting bracket 88 is then secured in place on the pan 68 by fasteners passed through holes or slots in the base portion 90 of the bracket, as shown in FIG. 9. The bracket is secured to the quill feed engagement control lever boss 40 after the lever is moved to the disengaged position. Fasteners are passed through holes or slots in the upstanding portion 92 of the bracket and threaded into the existing holes in the boss 40.

As illustrated in FIG. 8, the support arm 82 is mounted over the transmission cover opening 42, shown in FIG. 3, by a plurality of fasteners that are passed through the holes in the support arm and threaded into the existing holes in the quill head 22. Thereafter, as shown in FIG. 6, the support arm 82 is fastened to the pan 68 by fasteners passing through holes in the free end of the support arm and through slots formed in the bottom wall of the pan 68. The slots allow the arm to be aligned with the pan so that the upper housing is secured to the quill head in proper alignment.

With the assembly secured in place on the quill head, the ball screw 96 is oriented parallel to the longitudinal axis of the quill, and is spaced from the quill by a distance of approximately 2.75 inches. By providing a construction with a ball screw positioned so close to the quill, the moment exerted between the ball screw and the quill is reduced to a minimum. If the ball screw is moved away from the quill axis, such moments increase, leading to increased wear of the quill and ball screw.

The last step of installation of the assembly required in order to permit the assembly to drive the quill automatically is to secure the ball nut block 100 to the ball nut 98. As mentioned, and as shown in FIG. 11, the socket head cap screw 112 is provided in the side of the ball nut block 100 for tightening the block down against the journal 110 of the ball nut 98, and when so fastened together, the quill is tied into the transmission for movement with the output shaft of the motor. As such, energization of the motor causes the output shaft to rotate, turning the belt and transmitting the rotation to the ball screw 96. The ball nut 98, which is fixed to the block against rotation relative to the ball screw, is shifted axially as the screw is rotated, moving the block 100, and with it the quill, between the retracted and extended positions. When the motor turns the output shaft in a first direction, the quill is retracted. When rotated in an opposite direction, the output shaft drives extension of the quill.

Operation of the motor is controlled by the CNC controller 94, as shown in FIG. 5, typically as a result of a program set by a series of input signals keyed into a keypad 124 by an operator. The signal from the controller is delivered to the motor, controlling the direction and duration of its operation. Feedback is constantly provided to the controller by the sensor, which provides a continuous indication of the position or depth of the quill on a display 126 of the assembly 94.

If it is desired to manually operate the quill, the quill is lowered to the fully extended position shown in FIG. 11 so that the socket head cap screw on the ball nut block is aligned with a hole 128 in one of the angles of the lower housing so that a wrench can be used to loosen the socket head cap screw 112. As shown in FIG. 8, a small cover 130 is normally provided over the hole 128 to prevent chips and debris from entering the lower housing. However, the cover 130 is secured to the angle by a pin which permits the cover to be pivoted from over the hole in order to allow access to the socket head cap screw. A small stop 132 may also be provided for supporting the cover away from the hole to facilitate tightening and loosening of the socket head cap screw.

When the socket head cap screw 112 on the ball nut block is loosened, the quill and block are freed for movement independent of the ball screw 96 and the motor. As such, manual operation of the quill feed lever 35, shown in FIG. 1, is transmitted directly to the quill 24, and the quill is moved without any binding interference from the ball screw or motor. At the same time, as shown in FIG. 12, because the second element of the sensor is fastened to the ball nut block 100, it continues to provide a continuous indication of the quill position even though the ball nut 98, ball screw 96 and motor do not move. As such, the CNC controller can be used in the manual mode of operation to display the quill position, enabling a machinist to accurately extend the quill to a desired depth, and to repeat such operations with extreme precision. When the assembly is to be returned to automated operation, the quill is moved to the fully extended position shown in FIG. 11 and the ball nut block is fastened tight against the journal of the ball nut. A torque wrench is used to insure sufficient holding force, e.g. 20 ft-lbs, between the block and ball.

With reference to FIGS. 7 and 8, in order to tram the head of the milling machine and angle the quill relative to the table, it is not necessary to remove the cover 78 of the lower housing or to adjust the quill drive assembly in any way. Rather, the tramming bolts 32 are simply accessed from the side of the lower housing and loosened, allowing the head to be trammed. Once the position of the head is properly adjusted, the bolts are simply re-tightened. Thus, tramming of the head is not frustrated by the presence of the quill drive assembly.

Although the invention has been described with reference to the preferred embodiment illustrated in the attached drawing figures, it is noted that substitutions may be made and equivalents employed herein without departing from the scope of the invention as recited in the claims.

What is claimed is:

1. An automated quill drive assembly for use on a milling machine, wherein the milling machine includes a frame presenting a quill head, a quill supported on the head for rotation and for selective movement along a generally vertical axis between retracted and extended positions, and a manually actuated lever supported on the head and operatively connected to the quill for moving the quill between the retracted and extended positions, the automated quill drive assembly comprising:

a housing;

a motor supported on the housing;

a transmission supported on the housing and being adapted for connection between the motor and the quill of the milling machine for transmitting automated movement from the motor to the quill to move the quill between the retracted and extended positions; and means for sensing the position of the quill as the quill is moved between the retracted and extended positions, the sensing means providing an output signal indicative of the position of the quill during both manual and automated movement.

2. The automated quill drive assembly of claim 1, wherein the housing is mountable on the milling machine along a rear portion thereof, wherein the housing includes an opening in the rear portion, and wherein the transmission is connectable to the quill through the opening.

3. The automated quill drive assembly of claim 2, wherein the transmission includes a threaded rod and a block, wherein the rod is rotatably supported by the housing, wherein the block has a bore therethrough, wherein the block is connectable to the quill, and wherein the block is received on the rod via the bore for traveling movement thereon.

4. The automated quill drive assembly of claim 1, wherein the transmission further includes a nut threadably received on the rod and wherein the block is selectively coupleable with the nut.

5. The automated quill drive assembly of claimed 4, wherein the block includes a slot therein, the slot being generally parallel to the bore in the block, wherein the block includes a transverse bore, wherein the transverse bore receives a bolt, wherein tightening the bolt closes the slot and whereby the block is selectively coupleable to the nut by way of the block clamping on to the nut when the bolt is tightened.

* * * * *